United States Patent
Nakahara et al.

(10) Patent No.: US 8,064,013 B2
(45) Date of Patent: Nov. 22, 2011

(54) LIQUID CRYSTAL DISPLAY PANEL HAVING AN ORNAMENTAL REFLECTOR DEPLOYED AROUND THE PERIPHERY OF A DISPLAY REGION

(75) Inventors: Tae Nakahara, Azumino (JP);
Shinichiro Tanaka, Azumino (JP);
Hideki Kaneko, Azumino (JP);
Hironori Taniguchi, Azumino (JP);
Masashi Ariga, Azumino (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 11/808,965

(22) Filed: Jun. 14, 2007

(65) Prior Publication Data
US 2007/0291203 A1    Dec. 20, 2007

(30) Foreign Application Priority Data
Jun. 15, 2006  (JP) ................... 2006-166012

(51) Int. Cl.
*G02F 1/1335*  (2006.01)
*G02F 1/1333*  (2006.01)
(52) U.S. Cl. ........................ 349/113; 349/110
(58) Field of Classification Search .............. 349/110, 349/113, 153
See application file for complete search history.

(56) References Cited

U.S. PATENT DOCUMENTS

| | | | | |
|---|---|---|---|---|
| 5,936,694 A | * | 8/1999 | Suzuki et al. | 349/151 |
| 6,259,500 B1 | | 7/2001 | Kijima et al. | |
| 6,429,917 B1 | * | 8/2002 | Okamoto et al. | 349/110 |
| 6,765,637 B2 | * | 7/2004 | Takenaka | 349/113 |
| 7,034,905 B2 | * | 4/2006 | Sah et al. | 349/54 |
| 2004/0056998 A1 | * | 3/2004 | Hoshino | 349/113 |
| 2005/0041192 A1 | * | 2/2005 | Kuo et al. | 349/152 |
| 2005/0122452 A1 | * | 6/2005 | Yoshida et al. | 349/114 |
| 2007/0070272 A1 | * | 3/2007 | Gettemy et al. | 349/114 |

FOREIGN PATENT DOCUMENTS

| | | |
|---|---|---|
| JP | 2000-187210 A | 7/2000 |
| JP | 2003-228049 A | 8/2003 |
| JP | 2006-154428 A | 6/2006 |

* cited by examiner

*Primary Examiner* — Mark Robinson
*Assistant Examiner* — Paul Lee
(74) *Attorney, Agent, or Firm* — K&L Gates LLP

(57) ABSTRACT

A liquid crystal display panel 10 of the present invention includes an array substrate 11 with a display region in which a pixel electrode is formed in each of the regions enclosed by a plurality of signal lines and scan lines deployed as matrices, a opposed substrate 12 with a common electrode 31, a sealing agent 35 sealing a peripheral portion of the array substrate 11 and the opposed substrate 12, a liquid crystal layer sealed between both substrates, a border region 34 including a reflector 37 and a transparent electrode 38 is formed on an interlayer 23 at a periphery of the display region of the array substrate 11, and at least a part of an outer peripheral side is lacking from the common electrode 31 at a position corresponding to the border region 34. Thanks to such structure, the border region improves the appearance at the periphery of the display region, and the phenomenon of night vision alongside the scan line wiring does not occur.

6 Claims, 10 Drawing Sheets

LIQUID CRYSTAL DISPLAY PANEL HAVING AN ORNAMENTAL REFLECTOR DEPLOYED AROUND THE PERIPHERY OF A DISPLAY REGION

BACKGROUND

1. Technical Field

The present invention relates to a liquid crystal display panel. More particularly the present invention relates to a liquid crystal display panel having an ornamental reflective part (border region) for improving the appearance around the periphery of the display region, wherein dark lines do not appear alongside the scan line wiring in the border region.

2. Related Art

Over recent years the application of liquid crystal display panels has spread rapidly, not only in information and telecommunications equipment but in electrical equipment in general. Since liquid crystal display panels do not themselves emit light, the transmissive type of liquid crystal display panel that is equipped with a backlight is much employed.

However, since backlights consume large amounts of power, the reflective type of liquid crystal display panel which does not need a backlight have been used, especially for portable equipment, in order to reduce power consumption. But reflective liquid crystal display panels use external light as light source and therefore are difficult to view in dark interiors of rooms, etc. Accordingly, in recent times particular progress has been made with the development of liquid crystal display panels of a semi-transmissive type, which possess the capabilities of both the transmissive and reflective types.

Having, in each pixel region, a transmissive part equipped with a pixel electrode and a reflective part equipped with both a pixel electrode and a reflection electrode, in dark places semi-transmissive liquid crystal display panels display images by lighting a backlight and utilizing the transmissive part of the pixel region, and in bright places by utilizing external light via the reflective part, without lighting the backlight. Thus, such panels have the advantages of not needing to light the backlight always, and of being able to drastically reduce power consumption.

A specific example of a related-art semi-transmissive liquid crystal display panel is described below using FIGS. 4 to 6. FIG. 4 is a schematic plan view of a related-art single-terminal type semi-transmissive liquid crystal display panel, FIG. 5 is a plan view of one pixel portion of the array substrate in FIG. 4, and FIG. 6 is a cross-sectional view along VI-VI in FIG. 5. In FIG. 4, the non-display region around the periphery of the display region is depicted in an exaggerated manner for the sake of comprehension of the invention. Also, as used herein the term "display region" refers to the planar region where the pixel electrode is formed and where the alignment of the liquid crystal layer (the liquid crystal molecules) is controlled via the electric field applied to the pixel electrode, while the term "non-display region" refers to the planar region where no pixel electrode is formed and where the alignment of the liquid crystal layer, if present, is not controlled.

A related-art semi-transmissive liquid crystal display panel 10A has an array substrate 11 and a opposed substrate 12 that are opposed to each other and hold a liquid crystal layer between them. On the array substrate 11 there are formed, in the display region 14 on a transparent substrate 13 of glass or the like, parallel and equally-spaced multiple scan lines 17 constituted of aluminum, molybdenum or similar metal. Moreover, the scan lines 17 are coupled, via scan line wiring $17_1$, to a driver circuit placement portion 16 that is provided in the frame region 15 at the periphery of the display region 14. Further, auxiliary capacitance line 18 is formed roughly centrally between adjacent scan lines 17 so as to be parallel to the scan lines 17, and in addition, a gate electrode G for TFTs is drawn out from the scan lines 17. Further, common wiring is provided on the transparent substrate 13, but is omitted from the drawings.

Also, a gate insulator 19 constituted of silicon nitride, silicon oxide or the like is laid over the entire surface of the transparent substrate 13 so as to cover the scan lines 17, auxiliary capacitance line 18 and gate electrode G, and a semiconductor layer 20 constituted of amorphous silicon, polycrystalline silicon or the like is laid over the gate electrode G, with the gate insulator 19 interposed. Further, a plurality of signal lines 21 constituted of a metal such as aluminum or molybdenum are formed over the gate insulator 19 so as to be orthogonal to the scan lines 17, and the plurality of signal lines 21 are likewise connected, via signal line wiring $21_1$, to the driver circuit placement portion 16. Also, a source electrode S for TFTs is drawn out from these signal lines 21 so as to contact with the semiconductor layer 20, and furthermore, a drain electrode D of the same material as the signal lines 21 and source electrode S are provided on the gate insulator 19, likewise so as to contact with the semiconductor layer 20.

Each region enclosed by the two adjacent scan lines 17 and two adjacent signal lines 21 is equivalent to 1 pixel. TFTs that serve as switching elements are constituted by the gate electrode G, gate insulator 19, semiconductor layer 20, source electrode S and drain electrode D, one TFT being formed for each pixel. The auxiliary capacitance of each pixel is formed by the drain electrode D and auxiliary capacitance line 18.

A protective insulator (also termed passivation film) 22 of for example an inorganic insulating material is deposited over the whole surface of the transparent substrate 13 so as to cover the signal lines 21, TFTs and gate insulator 19. Over this protective insulator 22, an interlayer (also termed a flattening film) 23 constituted of organic insulator is deposited so as to extend over the entire transparent substrate 13. A contact hole 24 is formed in the protective insulator 22 and the interlayer 23 in position corresponding to the drain electrode D of the TFTs. Further, in each pixel a reflector 27 partially constituted of aluminum or similar metal is formed in the TFT and auxiliary capacitance line 18 side, and a pixel electrode 26 constituted of for example ITO (indium tin oxide) or IZO (indium zinc oxide) is formed on the surfaces of the reflector 27, contact hole 24 and interlayer 23. An orientation film (not shown in the drawings) is deposited over the surface of the pixel electrode 26 in such a manner as to cover all of the pixels.

The opposed substrate 12 is another transparent substrate 28 constituted of glass plate or the like, for example, on the surface of which a color filter layer 29 composed of red (R), green (G) and blue (B), corresponding to individual pixels, is provided at least in a position corresponding to the display region 14 of the array substrate 11. A top coat layer 30 is deposited on the surface of this color filter layer 29 in at least the position corresponding to the region where the reflector 27 is provided, in other words to the reflective part, of the array substrate 11, and furthermore, a counter electrode 31 and an orientation film (not shown in the drawings) are deposited on the surface of the top coat layer 30 and color filter layer 29. The top coat layer 30 is provided in order to cause the distance (the cell gap) between the pixel electrode 26 and the counter electrode 31 at the reflective part to be approximately ½ the cell gap at the transmissive part where no reflector 27 is provided, and in order that the color tone at the reflective part and at the transmissive part will be equivalent. The color filter layer 29 may, where appropriate, be used in combination with a color filter layer of cyan (C), magenta (M) and yellow (Y), etc., while in the case of a monochrome display, it may be that no color filter layer is provided.

The semi-transmissive liquid crystal display panel 10A is then obtained by: positioning opposite each other the array substrate 11 and opposed substrate 12 obtained in the foregoing manner; sealing with sealing agent 35 the peripheries of the array substrate 11 and opposed substrate 12; electrically coupling the common wiring of the array substrate 11 and the common electrode of the counter substrate 12 via a transfer electrode (not shown); injecting liquid crystal into the space between the two substrates through a liquid crystal injection hole (not shown); and sealing the liquid crystal injection hole.

In such semi-transmissive liquid crystal display panel 10A, a backlight (not shown) is deployed on the array substrate 11 side; in dark places the backlight is lighted and the requisite images are displayed by means of light transmitted through the semi-transmissive liquid crystal display panel 10A, while in bright places the requisite images are displayed by utilizing reflected external light, without lighting the backlight. But if the reflector is provided over the entire rear surface of each pixel electrode 26, a reflective liquid crystal display panel will be obtained. In such a semi-transmissive liquid crystal display panel or reflective liquid crystal display panel, the reflector 27 is in some cases provided on the surface of the pixel electrode 26, and it is common practice, for the sake of achieving good reflection efficiency at the reflective part and also of producing satisfactory white displays, to provide concavoconvexities on the surface of the interlayer 23 at the places where the reflector is provided, with the purpose of making the reflected light into diffuse reflected light.

In a related art semi-transmissive liquid crystal display panel or reflective liquid crystal display panel such as described above, the non-display region around the periphery of the display region is covered over by a light-blocking black matrix and an outer cover, so that essentially the display region alone will be visible to viewers. For example, in the related art semi-transmissive liquid crystal display panel 10A shown in FIG. 4, the non-display region 33 has at least the hatched portions covered over by a black matrix and the outer cover, so that the display portion 14 alone is visible to the viewer.

In recent years however, there have come into use liquid crystal display panels in which, in order to improve the appearance, a reflective part that reflects external light is formed in the non-display region around the periphery of the display region, and such non-display region with reflective part formed therein is used for ornament. In a semi-transmissive liquid crystal display panel 10B that uses for ornament such non-display region with reflective part formed therein, the non-display area 33 is covered by the black matrix and outer cover and is invisible to the viewer, whereas the portion of the non-display region 34 where the reflective part is formed is visible to the viewer, as shown in FIG. 7. FIG. 7 is a schematic plan view of a semi-transmissive liquid crystal display panel 10B that uses for ornament a non-display region with a reflective part formed therein; here too, the non-display region around the periphery of the display area is depicted in an exaggerated manner. Structural elements in FIG. 7 that are the same as those of semi-transmissive liquid crystal display panel 10A in FIG. 4 are assigned identical reference numerals, and detailed descriptions thereof are omitted.

At this portion of the non-display region 34 where the reflective part is formed, no pixel electrode is provided and therefore the orientation of the liquid crystal molecules does not vary. Hence such portion is seen by the viewer as being the same color as the color filter layer, provided on the opposed substrate 12, corresponding to such portion. Usually, the color filter layer provided for such portion will be of the same kind as that formed in the display region 14, so that such portion will effectively appear white in color. To have such portion of the non-display region 34 where the reflective part is formed appear in a satisfactory white color, it is necessary, as in a reflective or semi-transmissive liquid crystal display panel, to employ almost the same reflective display structure as in the reflective part of the display region. To that end, concavoconvexities are provided on the surface of the interlayer that underlies the reflectors. Below, such ornamental portion of the non-display region 34 where the reflective part is formed is termed the "border region" and is assigned the same reference numeral "34" when described.

JP-A-2003-228049 discloses a reflective or semi-transmissive liquid crystal display panel in which the concavoconvexities provided on the surface of the interlayer at the reflective part of the display region are also provided in the non-display region, with the purpose of lessening display irregularities due to occurrence of unevenness in the cell gap near the boundary between the display region and non-display region. However, no mention is made therein of making part of the non-display region into a border region such as described above.

In a semi-transmissive liquid crystal display panel 10B having a border region 34 such as described above, the border region 34, while undergoing no change in display status, nevertheless is able to exert an aesthetic ornamental effect whereby the periphery of the display region 14 appears white at all times, so that the appearance is greatly enhanced. However, detailed investigation by the present inventors revealed that in a semi-transmissive liquid crystal display panel 10B having a border region 34 such as described above, dark lines appear alongside the scan line wiring $17_1$ in the areas X enclosed by dashed lines on either side of the display region 14 in FIG. 7.

Upon conducting a series of various investigations into the causes of the occurrence of the night vision phenomenon alongside the scan line wiring $17_1$ of the border region in such a liquid crystal display panel having a border region 34, the present inventors discovered that it was due to causes described below. FIG. 8 is a cross-sectional view of the frame region 15 along line VIII-VIII in the semi-transmissive liquid crystal display panel 10B of FIG. 7. In this frame region 15, plural scan line wirings $17_1$ and common wirings 40 are formed on the surface of the transparent substrate 13 on the array substrate 11 side, and the scan line wirings $17_1$ and common wirings 40 are covered by a gate insulator 19 and protective insulator 22. Further, in the border region 34 the surface of the protective insulator 22 is covered by an interlayer 23, and columnar spacers 39 for keeping the cell gap constant are deployed at appropriate intervals around the edge portions. Also, the peripheral portions of the array substrate 11 and opposed substrate 12 are sealed with sealing agent 35.

The region on the opposed substrate 12 where the black matrix 36 is provided forms the non-display region 33, and the area between the non-display region 33 and the display region 14 forms the border region 34. The surface of the interlayer 23 of the border region 34 is formed to have concavoconvexities, and on such concavoconvex surface of the interlayer 23 is formed a reflector 37 constituted of for example aluminum metal; furthermore, a transparent electrode 38 constituted of ITO or IZO is formed on the surface thereof, and the surfaces of both the reflector 37 and the transparent electrode 38 are formed to be concavoconvex. For the sake of balance with the process for producing the dummy electrode for static protection in the related art, the reflector 37 and the transparent electrode 38 are, as shown in FIG. 9, deposited with the same pitch as the reflector 37 and pixel electrode 26 of the display region 14, in an isolated condition such that the reflector 37 and the transparent electrode 38 are not electrically coupled to anything and are in a floating state. A black matrix is formed on the opposed substrate 12 in such a manner as to block light at the positions corresponding to the peripheries of each pixel electrode 26 of the display region 14 and of each transparent electrode 38 in the border region 34 of the array substrate 11, but is omitted in FIG. 8. FIG. 9 is an enlarged schematic view of the top left portion of the array substrate in the liquid crystal display panel 10B of FIG. 7.

Thus, it might be supposed that the portions of the border region 34 alongside the scan line wiring 17₁ ought not to appear dark, because the liquid crystal molecules present between the transparent electrode 38 and the counter electrode 31 do not move, since there is no electric potential difference between the transparent electrode 38 and the counter electrode 31, as no potential is generated in the transparent electrode 38, which is in a floating state. Yet, since the voltage applied to the scan line wiring 17₁ is high AC voltage (for example ±15V), the voltage applied between the scan line wiring 17₁ and the counter electrode 31 is divided and voltage is generated in the transparent electrode 38, so that a voltage $V_{LC}$ is applied between the transparent electrode 38 and the counter electrode 31, and due to such voltage $V_{LC}$ the alignment of the liquid crystal molecules between the transparent electrode 38 and the counter electrode 31 varies, with the result that the phenomenon of dark appearance occurs alongside the scan line wiring 17₁ in the border region 34. The voltage that is applied to the signal line wiring 21₁ is far lower than that applied to the scan line wiring 17₁ and therefore effectively does not exert any influence on the liquid crystal molecules in the border region 34.

The voltage $V_{LC}$ that occurs between the transparent electrode 38 and the opposed electrode 31 will now be described using FIG. 10. The average thickness L1 of the interlayer 23 between the scan line wiring 17₁ and the transparent electrode 38 is approximately 1.45 μm, and the permittivity ε of the polyimide normally used for the interlayer 23 is 3.4, so that a capacitor $C_S$ with the interlayer 23 as dielectric body arises between the scan line wiring 17₁ and the transparent electrode 38. Further, the average distance L2 between the transparent electrode 38 and the opposed electrode 31 is approximately 2.0 μm, and the permittivity Δε of the liquid crystal layer generally used is approximately 7, so that a capacitor $C_{LC}$ with the liquid crystal layer as dielectric body arises between the transparent electrode 38 and the opposed electrode 31.

This means that the voltage $V_o$ that is applied between the scan line wiring 17ᵢ and the opposed electrode 31 is divided by the series circuits of the capacitor $C_S$ that arises between the scan line wiring 17₁ and the transparent electrode 38, and of the capacitor $C_{LC}$ that arises between the transparent electrode 38 and the opposed electrode 31, so that the voltage $V_{LC}$ expressed by equation (1) below is applied between the transparent electrode 3 and the opposed electrode 31. As an example, where the voltage $V_0$ applied between the scan line wiring 17₁ and the opposed electrode 31 is 15V, $V_{LC}$ will be approximately 6 V.

Formula 1

$$V_{LC} = \frac{C_S}{C_S + C_{LC}} V_o \approx 6 \ [V] \tag{1}$$

SUMMARY

As a result of various investigations aimed at resolving the night vision phenomenon alongside the scan line wiring 17₁ of the border region 34 due to the foregoing causes, the inventors have found that the phenomenon of the border region 34 appearing dark along the scan line wiring 17₁ as described above is not generated, when there is no potential difference between the opposed electrode 31 and the transparent electrode 38. However, it was difficult to adopt such a structure immediately, because of increase in manufacturing steps and manufacturing cost. By conducting further research, the inventors have found that when at least an outer peripheral side, or more preferably, all of the opposed electrode 31 at a position corresponding to the border region 34 does not exist, a state that the electric field is not applied to the liquid crystal molecules can be created. This enables to eliminate the phenomenon that the border region 34 appears dark along the scan line wirings 17₁, thereby completing the present invention.

An advantage of some aspects of the invention is to provide a liquid crystal display panel having a border region around the periphery of the display region, in which night vision phenomena will not occur in such border region.

According to an aspect of the invention, a liquid crystal display panel includes: an array substrate that has a display region in which a plurality of signal lines and scan lines deployed as matrices, plus signal line wiring and scan line wiring connected to the signal lines and scan lines respectively, plus common wiring, are provided on a transparent substrate, an insulator is coated over the surface of these, and a pixel electrode is formed in each of the regions on the insulator that are enclosed by the plurality of signal lines and scan lines; a opposed substrate that has a common electrode; and a liquid crystal layer that is sealed between the array substrate and the opposed substrate by means of sealing agent that seals together the peripheries of the two substrates. It also includes an ornamental reflective part including a reflector being deployed around the periphery of the array substrate's display region; the outer edges of the ornamental reflective part being sealed by the sealing agent, and at least a part of an outer peripheral side not being provided to the common electrode at a position corresponding to the ornamental reflective part.

According to the above liquid crystal display panel of the invention, at least a part of the outer peripheral side is not being provided to the common electrode at the position corresponding to the ornamental reflective part. As there is no electric field applied to the liquid crystal layer by a signal voltage being applied to the scan line wiring, it does not appear dark with lines along the scan line wiring as in the related art. As a result, the liquid crystal display panel having the ornamental reflective part, that is, the border region, with an attractive appearance in white which uses reflection of external light by the reflector can be obtained. In such a case, by not providing all the common electrodes at the position corresponding to the ornamental reflective part, the electric field applied to the liquid crystal layer by the signal voltage being applied to the scan line wiring can be eliminated substantially and completely. But taking into account the likelihood of influence from electrostatic charges from outside, and to prevent the common electrode corresponding to the display region from misplacing by a mask misalignment during manufacturing, it is preferable not to provide at least a part of the outer peripheral side of the common electrode at the position corresponding to the ornamental reflective part.

In the above liquid crystal display panel, preferably, a transparent electrode is formed on a surface or a rear surface of the reflector.

According to the above liquid crystal display panel, there is no need to adopt a special manufacturing method or a manufacturing step anew, so that the common electrode at the position corresponding to the ornamental reflective part does not provide a part of the outer peripheral side. As a result, the liquid crystal display panel having the border region which produces a good ornamental effect can be obtained with ease without increasing manufacturing steps.

Further, in the above liquid crystal display panel, the reflector of the ornamental reflective part may have a concavoconvex structure.

According to the above liquid crystal display panel, the pixel electrode is formed in the display region. As the pixel electrode is formed by the transparent electrode, the structure of the ornamental reflective part can be made approximately the same as the structure of the display region, when the transparent electrode is also formed to the ornamental reflective part. As a result, a difference in appearance between the display region and the ornamental reflective part is reduced, and the liquid crystal display panel having the border region which produces a good ornamental effect can further be obtained.

Moreover, a reflector with a concavoconvex structure may be formed on part or whole of the front surface or rear surface of the pixel electrode.

According to the above liquid crystal display panel, light entered from outside becomes diffused reflected light, as the reflector of the ornamental reflective part has the concavoconvex structure. As a result, it looks pure white, and the liquid crystal display panel which produces a good ornamental effect can be obtained.

Also, in the above liquid crystal display panel, it is possible, not only for the transmissive type of liquid crystal display panel but also for the semi-transmissive or the reflective type, to obtain a liquid crystal display panel that yields an ornamental effect with a fine white appearance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will now be described with reference to the accompanying drawings. It should be borne in mind however that the following embodiments are merely illustrative examples of semi-transmissive liquid crystal display panels that realize the technical concepts of the invention. The embodiments are not intended to limit the invention to these particular semi-transmissive liquid crystal display panels. The invention can equally well be adapted to transmissive or reflective liquid crystal display panels and other embodiments contained within the scope of the claims.

First Embodiment

Figure 1:
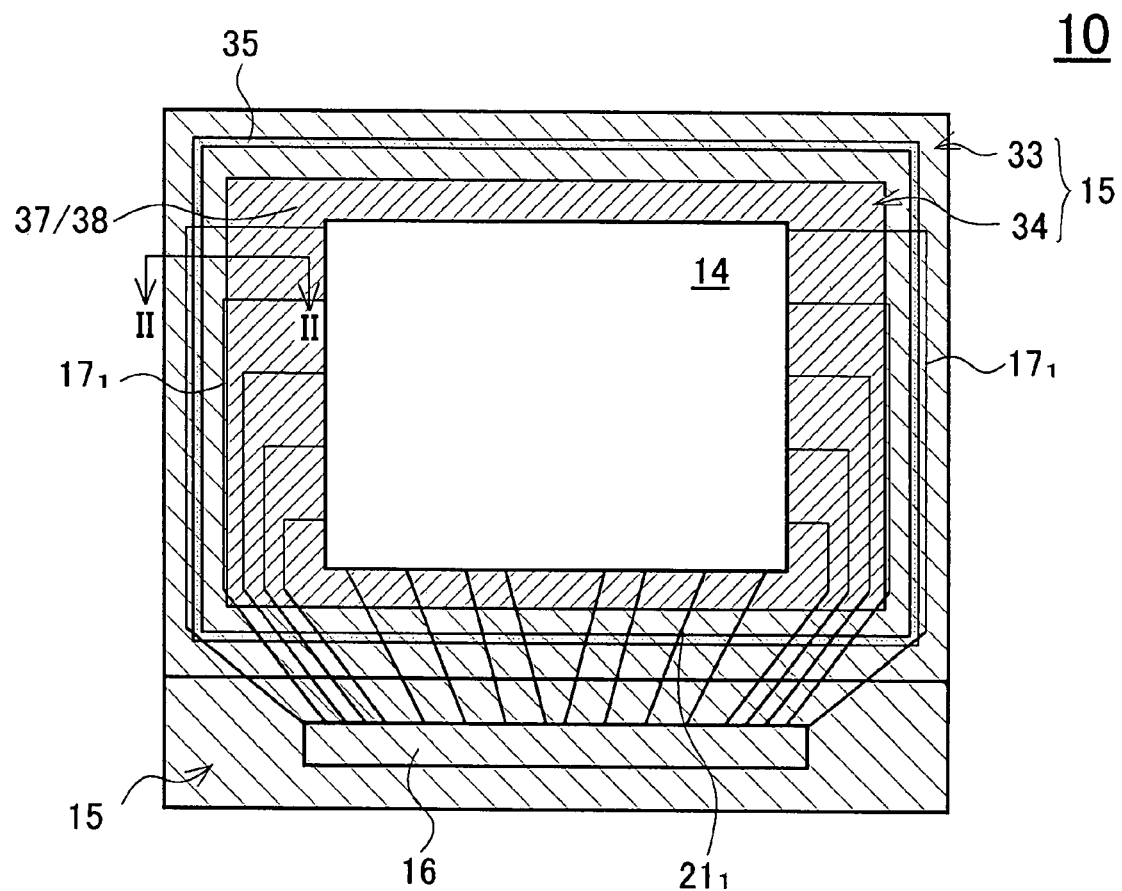
FIG. 1 is a schematic plan view of a single-terminal type semi-transmissive liquid crystal display panel according to the first embodiment.
Figure 2:
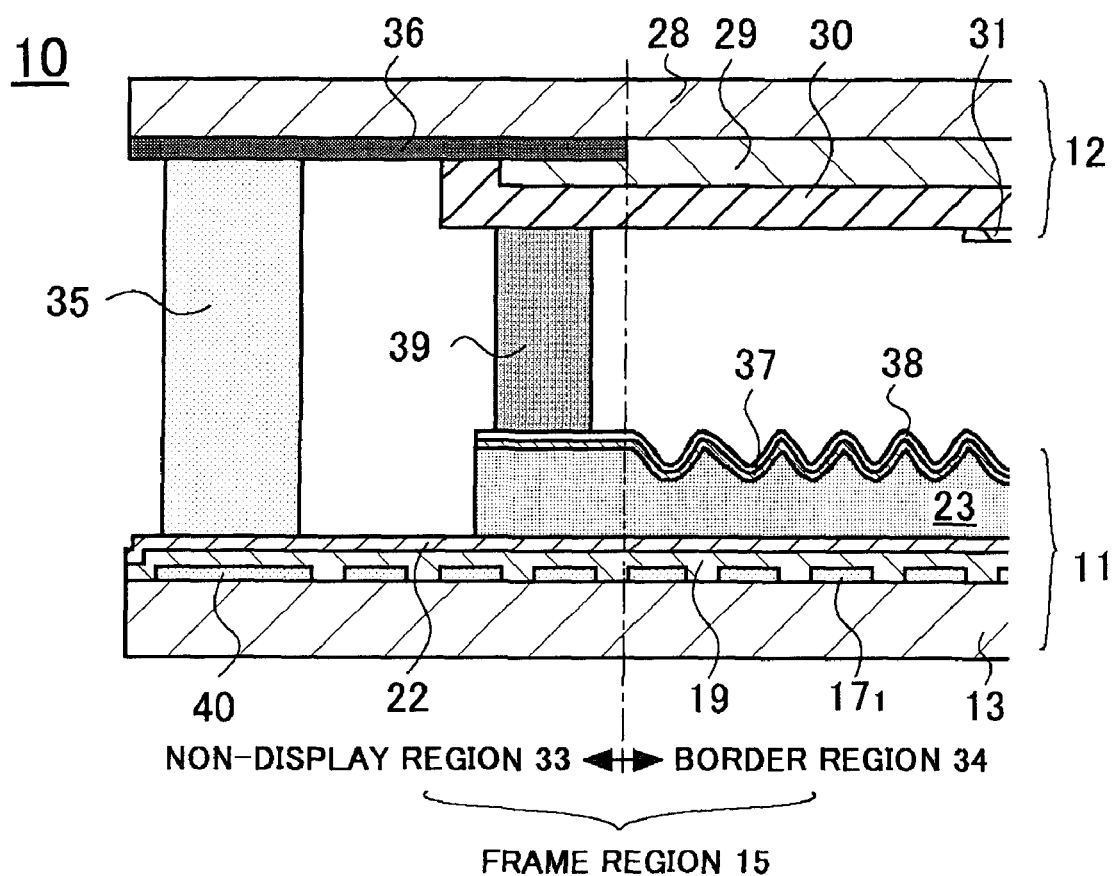
FIG. 2 is a cross-sectional view along line II-II in FIG. 1.
Figure 5:
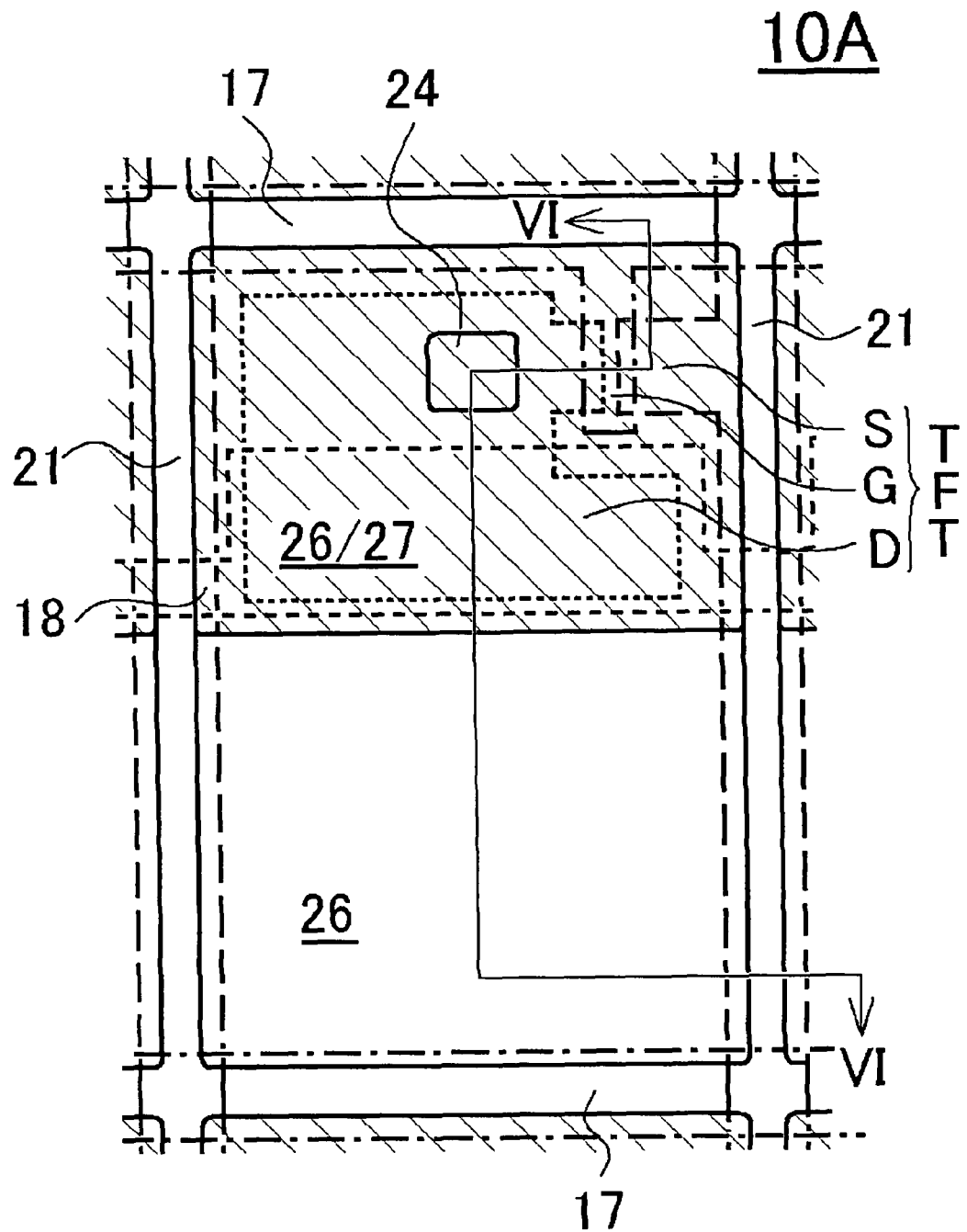
FIG. 5 is a plan view of one pixel portion of the array substrate in FIG. 4.
Figure 6:
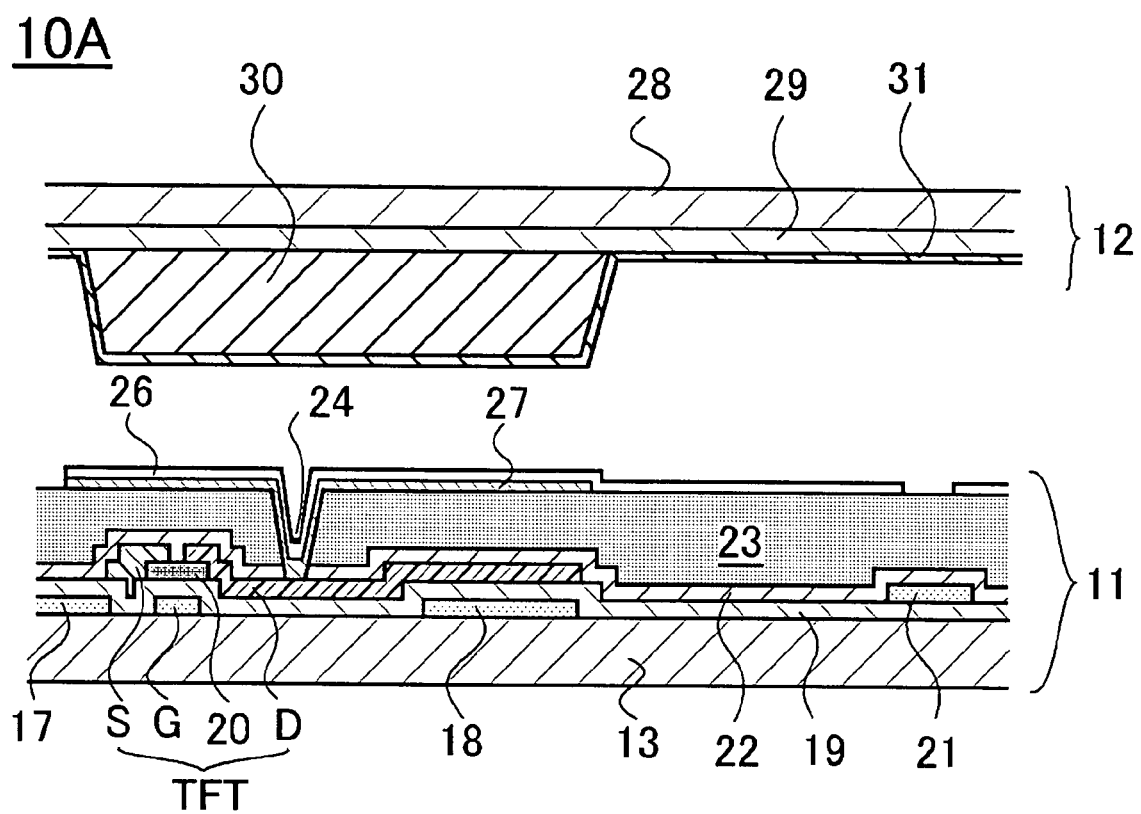
FIG. 6 is a sectional view taken along the line VI-VI of FIG. 5.
Figure 7:
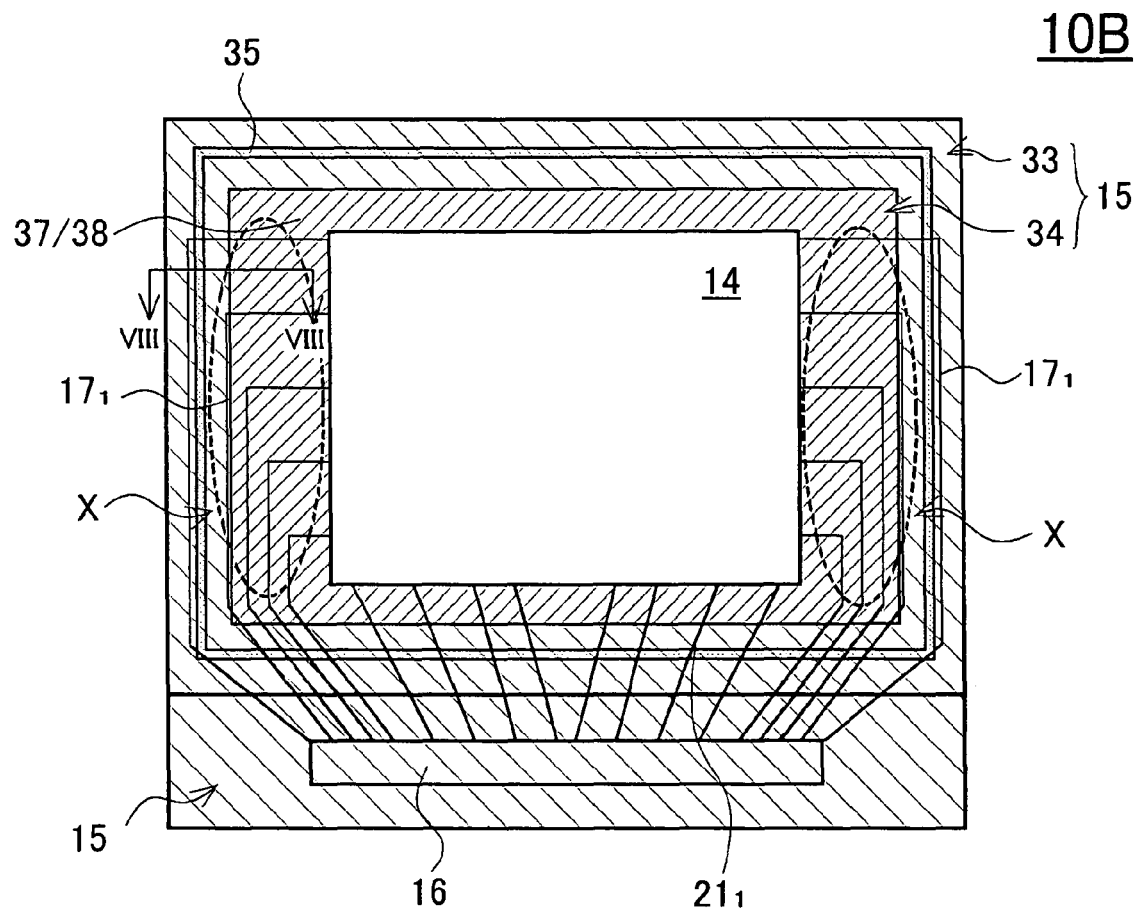
FIG. 7 is a schematic plan view of a liquid crystal display panel that uses for ornament a non-display region with a reflective part formed therein.
Figure 8:
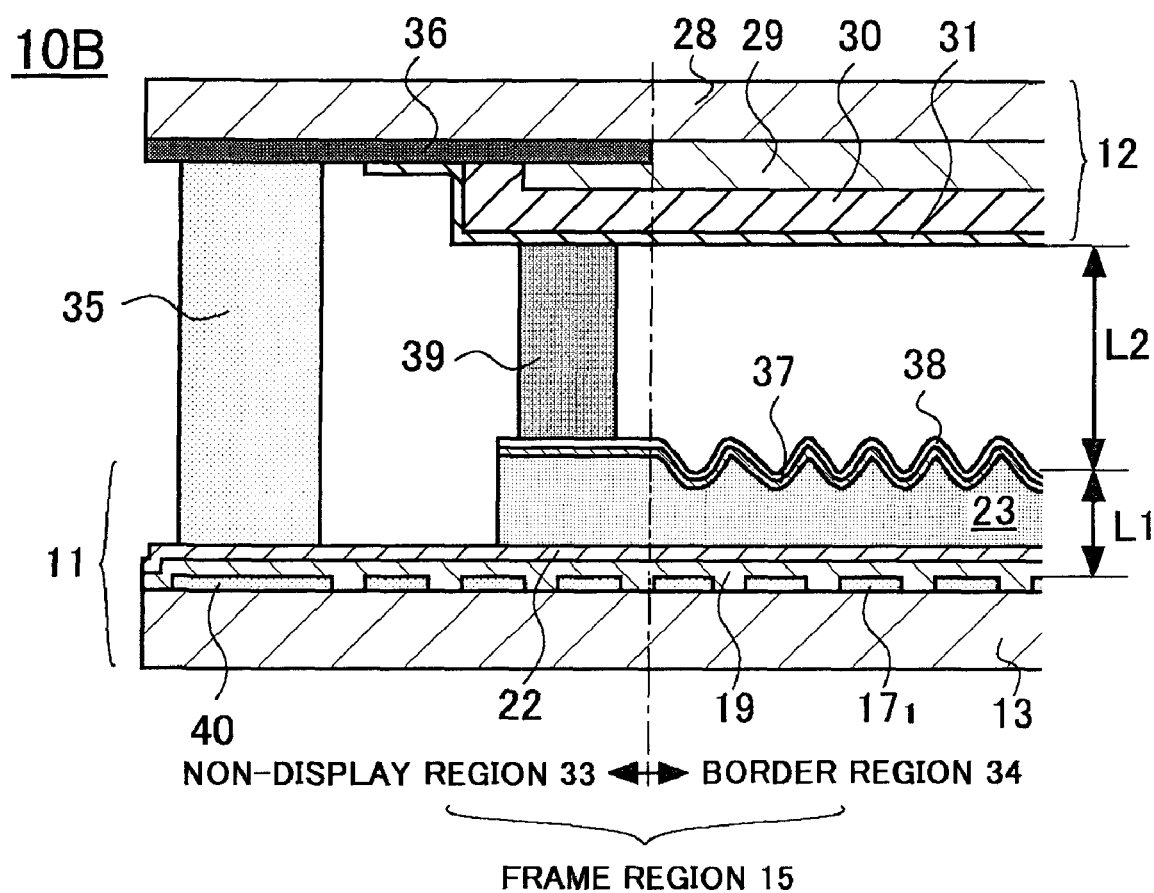
FIG. 8 is a sectional view taken along the line VIII-VIII of FIG. 7.

A semi-transmissive liquid crystal display panel 10 of a first embodiment is described below using FIGS. 1 to 2. FIG. 1 is a schematic plan view of a single-terminal type semi-transmissive liquid crystal display panel according to the first embodiment. FIG. 2 is a cross-sectional view along line II-II in FIG. 1. Since the configuration of the pixels in the display region of the array substrate in the semi-transmissive liquid crystal display panel 10 of the first embodiment is substantially the same as that of the related art items shown in FIGS. 5 and 6, component elements that are identical to those in the related art cases are assigned the identical reference numerals, and where necessary are described with the aid of FIGS. 5 and 6.

The semi-transmissive liquid crystal display panel 10 of the first embodiment has an array substrate 11 and a opposed substrate 12 that are opposed to each other and hold a liquid crystal layer between them. The array substrate 11 has a transparent substrate 13 on which are formed, equally spaced and in parallel, a plurality of scan lines 17 in the display region 14. The a plurality of scan lines 17 are coupled via scan line wiring $17_1$ to a driver circuit placement portion 16 that is provided in the frame region 15 at the periphery of the display region 14. Further, auxiliary capacitance line 18 is formed in roughly central positions between adjacent scan lines 17 so as to be parallel to the scan lines 17, and moreover a gate electrode G for TFTs are drawn out from the scan lines 17. In addition, common wiring 40 is provided on the transparent substrate 13.

Also, a gate insulator 19 is deposited over the entire surface of the transparent substrate 13 so as to cover the scan lines 17, auxiliary capacitance line 18 and gate electrode G, a semiconductor layer 20 is formed over the gate electrode G with the gate insulator 19 interposed, a plurality of signal lines 21 are formed on the gate insulator 19 so as to be orthogonal to the scan lines 17, and the plurality of signal lines 21 are likewise coupled to the driver circuit placement portion 16 via signal line wiring $21_1$. Moreover, a source electrode S for TFTs are drawn out from the signal lines 21 so as to contact with the semiconductor layer 20, and in addition, a drain electrode D is provided on the gate insulator 19 so as likewise to contact with the semiconductor layer 20.

Each region enclosed by the scan lines 17 and signal lines 21 is equivalent to 1 pixel, and in each pixel there is formed a TFT. A protective insulator 22 is deposited over the entire surface of the transparent substrate 13 so as to cover the signal lines 21, TFTs and gate insulator 19, and on the protective insulator 22 is deposited an interlayer 23 extending over the whole of the transparent substrate 13. Also, contact hole 24 are formed in the protective insulator 22 and interlayer 23 in positions corresponding to the TFTs' drain electrode D. Further, in each pixel there are formed a TFT plus, along part of the auxiliary capacitance line 18, a reflector 27 constituted of for example aluminum metal, and on the surfaces of the reflector 27, contact hole 24 and interlayer 23, a pixel electrode 26 constituted of for example ITO or IZO is formed. An alignment layer (not shown) is deposited over the surface of the pixel electrode 26 so as to cover all the pixels. In the example described here the interlayer 23 is deposited over the entire surface of the transparent substrate 13, but alternatively the interlayer might not be formed, in which case the contact hole 24 would be formed in the protective insulator 22, and the reflector 27 and pixel electrode 26 would be formed thereon.

Figure 9:
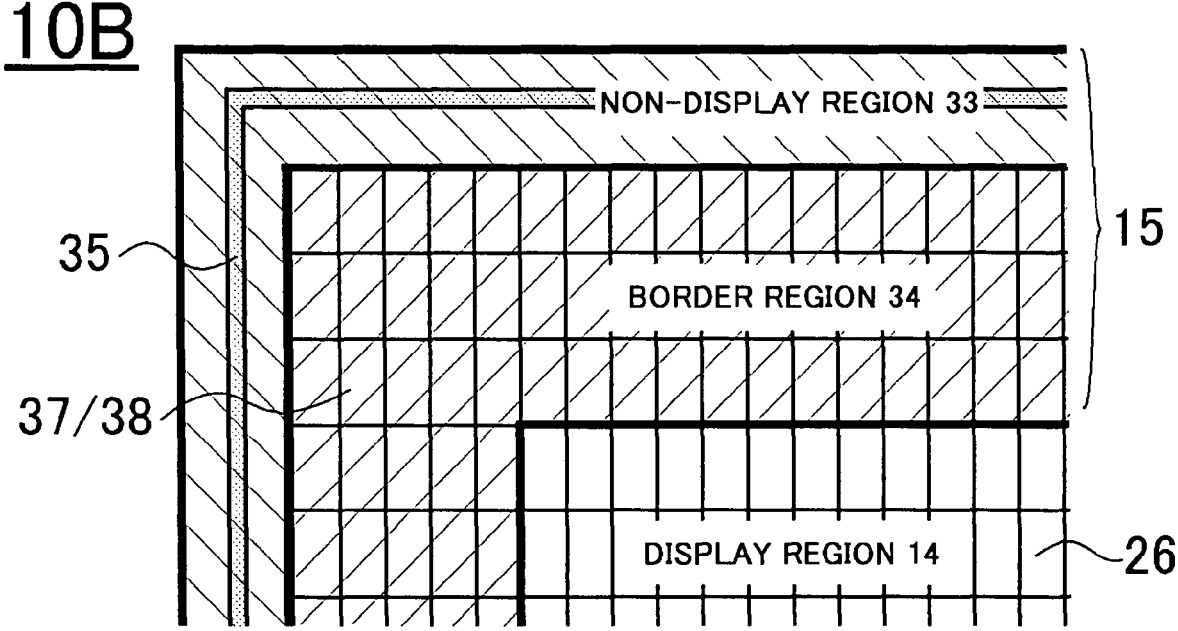
FIG. 9 is a schematic partially enlarged view of an upper left side of the liquid crystal display panel of FIG. 7.
Figure 10:
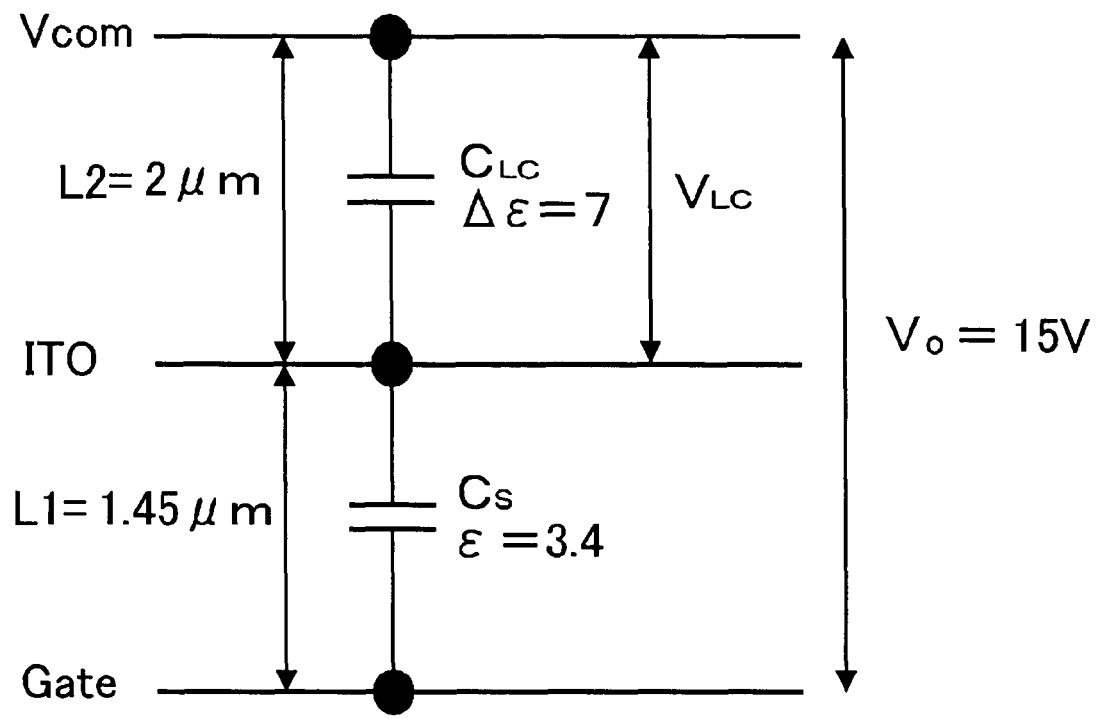
FIG. 10 is an equivalent circuit diagram explicating the voltage $V_{LC}$ that occurs between the transparent electrode and the common electrode.

The periphery of the display region 14 constitutes the frame region 15. In the frame region 15, the surface of the interlayer 23 that is adjacent to the display region 14 is formed with concavoconvexities, but part of such periphery is formed with a flat surface. On the portions of the interlayer 23's surface that are formed with concavoconvexities, a reflector 37 and a transparent electrode 38 are formed in an integrated manner. Thus, as shown in FIG. 1, the frame region 15 of the array substrate 11 in the present embodiment has, viewed from above, a border region 34 that is formed around the periphery of the display region 14 and covered with the reflector 37 and the transparent electrode 38; furthermore, at the periphery thereof there is a non-display region 33. In view of manufacturing steps of a dummy electrode for electrostatic protection of the related art, as the one of the related art shown in FIG. 9, the reflector 37 and the transparent electrode 38 are separated in a state that the reflector 37 and the transparent electrode 38 are disposed at the same pitch as the pixel electrode 26 of the display region 14. The reflector 37 and the transparent electrode 38 are not electrically coupled to anywhere, being in a floating state.

The opposed substrate 12 is constituted of another transparent substrate 28, on which a black matrix 36 is formed in a position corresponding to the non-display region 33 of the array substrate 11. Besides that, a black matrix is also provided so as to shade at least the periphery of the pixel electrode 26 in the display region 14 of the array substrate 11, but is omitted from FIG. 2. In the transmissive liquid crystal display panel 10 of the first embodiment, there is no actual need to provide a black matrix in a position corresponding to the border region 34, but to avoid any need to change the manufacturing method used in the related art, such black matrix (not shown in the drawings) for the border region 34 is nonetheless provided. Further, a color filter layer 29 is provided in positions corresponding to at least the display region 14 and border region 34 of the array substrate 11, so as to correspond to the individual pixels. In at least the position on the surface of the color filter layer 29 of the display region 14 that correspond to the reflective part, a top coat layer 30 is deposited that is for causing the reflective part's cell gap to be roughly ½ the transmissive part's cell gap, so that the color tone at the reflective part and at the transmissive part will be equivalent. Further, a common electrode 31 and an alignment layer (not shown in the drawings) are deposited over the surface of the top coat layer 30 and color filter layer 29. In the liquid crystal display panel 10 of the present embodiment, as shown in FIG. 2, the top coat layer 30 is provided to the entire border region 34. However, the common electrode 31 is provided at a range slightly stretching over the border region 34 from the display region 14, and it is not provided to an outer edge side of the border region.

The array substrate 11 and the common substrate 12 obtained as above are made to oppose to each other. A columnar spacers 39 which is to maintain the cell gap at a fixed value is disposed accordingly, and the periphery is sealed by a sealing agent 35. The common wiring 40 provided to the common electrode 31 and the array substrate 11 interposing another transfer electrode (not shown) therebetween, is electrically coupled. A liquid crystal is injected from a liquid crystal injection hole (not shown) formed by the sealing agent 35. After the liquid crystal injection hole is sealed, the semi-transmissive liquid crystal display panel 10 of the embodiment can be obtained.

Therefore, according to the semi-transmissive liquid crystal display panel 10 of the embodiment, the reflector 37 and the transparent electrode 38 provided to the border region 34 are not electrically coupled to anywhere, being in a floating state. As the common electrode 31 does not substantially exist at a portion where the opposed substrate 12 is opposed to the reflector 37 and the transparent electrode 38, an electric field is not applied to the liquid crystal molecules existing in the border region 34. Because the liquid crystal molecules existing in the border region 34 are not affected by electric potential of the scan line wiring $17_1$ provided under the interlayer 23, thereby eliminating the phenomenon that the border region 34 appears dark along the scan line wiring $17_1$ as the related art. Therefore, according to the semi-transmissive liquid crystal display panel 10 of the embodiment, the semi-transmissive liquid crystal display 10 having the border region 34 which produces an attractive ornamental effect in white can be obtained.

Normally, the common electrode 31 should only be provided at a position corresponding to the display region 14. However, it is difficult only to provide at the position exactly corresponding to the display region 14, when a mask misalignment during manufacturing and the like are taken into account. As the common electrode 31 is required at least at the position corresponding to the display region 14, as shown in FIG. 2, it is preferable to cover a portion of the border region 34 slightly, so as the common electrode 31 will not be provided at a part of the outer peripheral side of the border region 34.

According to the liquid crystal display panel 10 of the embodiment, there is no need to adopt a special step anew not to provide a part of the outer peripheral side of the common electrode 31 at the position corresponding to the border region 34. The liquid crystal display panel having the border region which produces the ornamental effect in white can be obtained with ease, without increasing manufacturing steps or a special wiring.

Further, according to the liquid crystal display panel 10 of the present embodiment, the position on the periphery of the opposed substrate that correspond to the border region 34 is covered by a black matrix 36. This means that although the display region 14 and border region 34 will be clearly visible from the exterior, the outer periphery of the border region 34 will not be visible from the exterior. Thus, the border region 34's outer periphery, which has no ornamental effect, is rendered invisible from the exterior, with the result that a liquid crystal display panel 10 can be obtained that has a border region 34 that exerts an ornamental effect with good appearance by utilizing the external light reflected by the reflector 37.

Also, although the example in the first embodiment is a case where the inner surface of the portion of the opposed substrate 12 that correspond to the non-display region 33 is covered with a black matrix 36 to block light, the invention is not limited to this. Light could alternatively be blocked by providing the black matrix on the outer side of the opposed substrate 12, or the outer cover could be used to shade the opposed substrate 12. However, since the black matrix formation process is contained in the formation of the color filter layer 29 of the opposed substrate 12, the black matrix 36 can be formed at the same time as such black matrix formation, and therefore it will be preferable to shade the inner surface of the portion of the opposed substrate 12 that correspond to the non-display region 33 by covering them with the black matrix 36. Moreover, such will preferably be combined with use of the outer cover to shade the outer side of the opposed substrate 12, in the interest of protecting the frame region of the semi-transmissive liquid crystal display panel 10.

According to the semi-transmissive liquid crystal display panel 10 of the embodiment, an example of providing the concavoconvex structure to the surface of the interlayer 23 of the border region 34 is shown. When the concavoconvex structure is smoothed and made flat, some ornamental effect can be achieved, as it becomes a mirror plane. However, as a boundary between the display region 14 and the border region becomes highly visible, it is more attractive in white by providing the concavoconvex structure, if not expecting a special effect.

Figure 3:
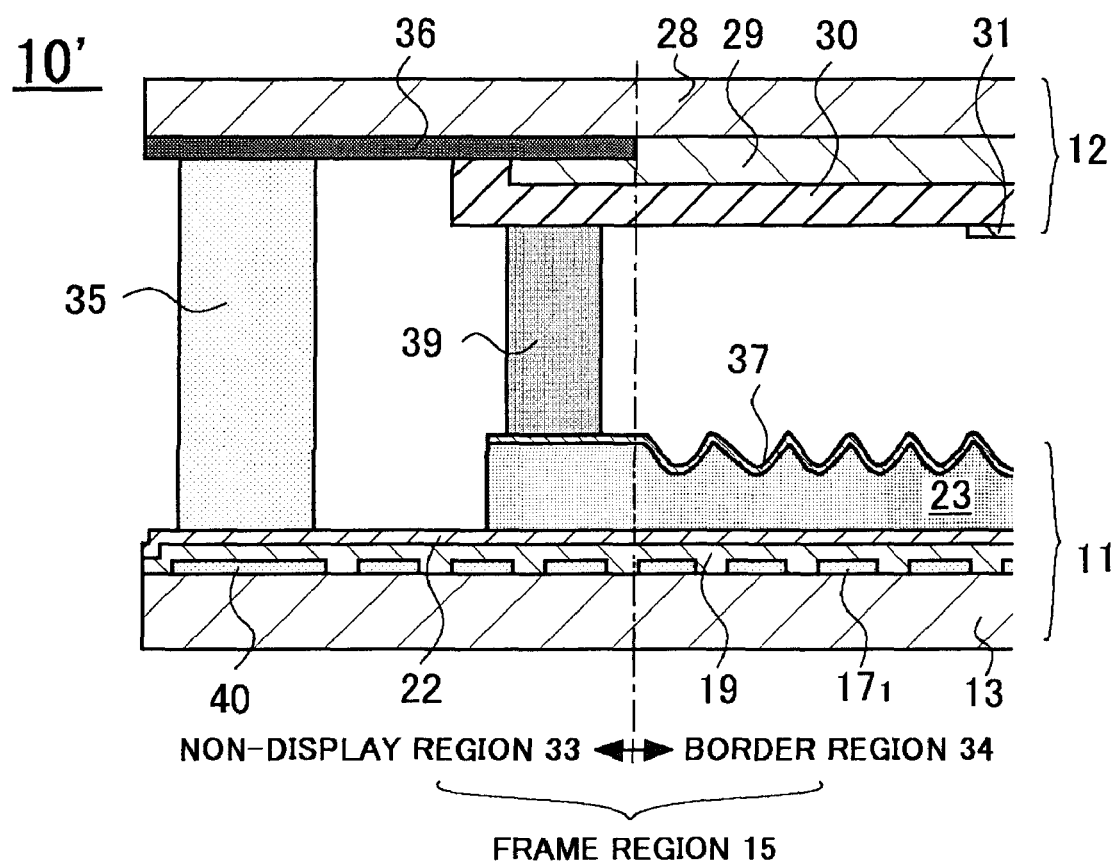
FIG. 3 is a sectional view of a modification of the single-terminal type semi-transmissive liquid crystal display panel corresponding to FIG. 2.
Figure 4:
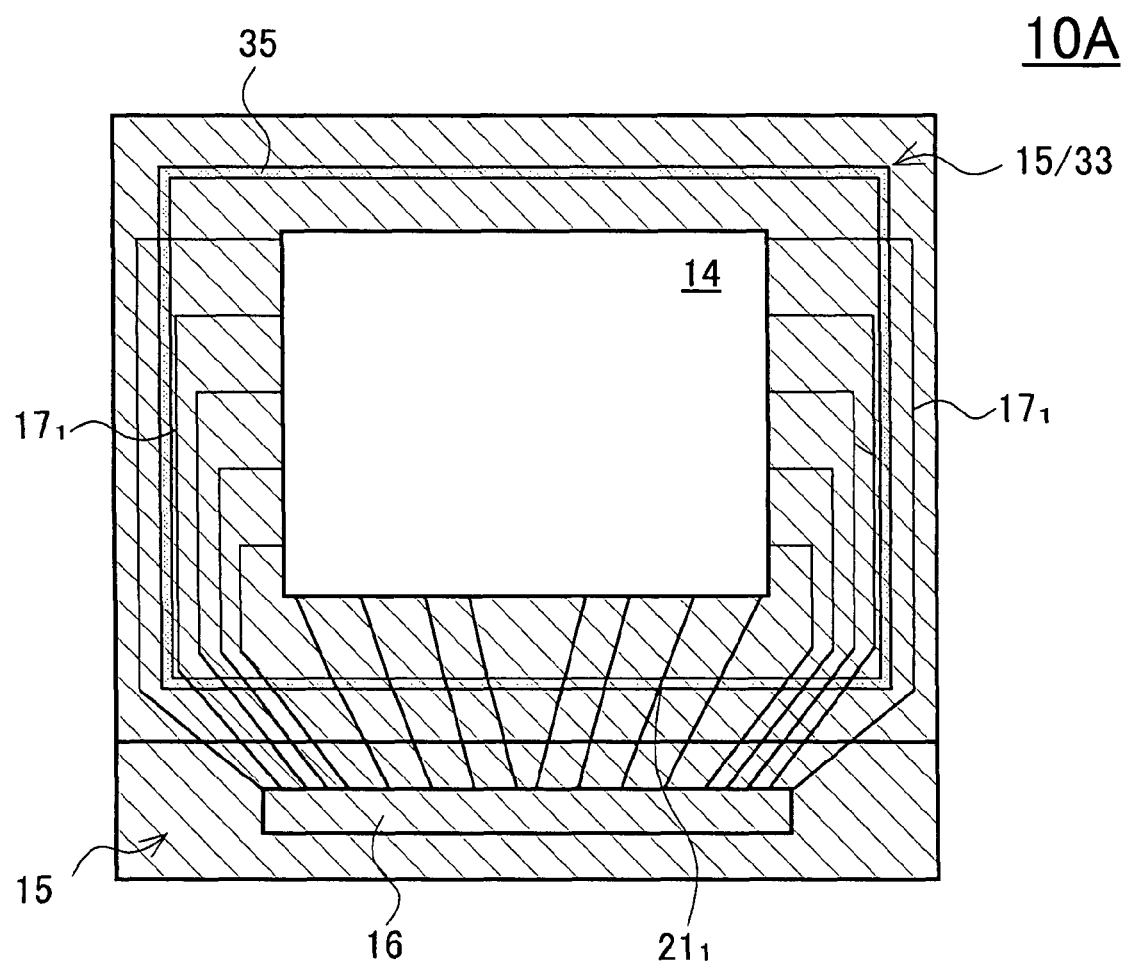
FIG. 4 is a schematic plan view of a related-art single-terminal type semi-transmissive liquid crystal display panel.

Further, according to the semi-transmissive liquid crystal display panel 10 of the embodiment, an example of forming the transparent electrode 38 on the surface of the reflector 37 positioned at least at the border region 34 is shown. However, in the liquid crystal display panel of the present invention, if the reflector 37 exists at least at the border region 34, the same advantage can be produced even if the transparent electrode 38 does not exist. FIG. 3 shows a sectional view of a modification of the semi-transmissive liquid crystal display panel 10' corresponding to FIG. 2, which does not provide the transparent electrode on the reflector 37 at the border region 34. A structure of the modification of the liquid crystal display panel 10' shown in FIG. 3 does not differ from that of the liquid crystal display panel 10 of the embodiment shown in FIG. 2, except that the transparent electrode does not exist on the surface of the reflector 37. Therefore, the same components as those of the liquid crystal display panel 10 of the embodiment are denoted by the same reference numerals and the detailed description thereof are omitted.

What is claimed is:

1. A liquid crystal display panel, comprising:
an array substrate including:
a display region in which a plurality of signal lines and scan lines deployed as matrices, plus signal line wiring and scan line wiring connected to the signal lines and the scan lines respectively, are provided on a transparent substrate, an insulator is coated over the surface of these, and a pixel electrode is formed in each of the regions on the insulator that are enclosed by the plurality of signal lines and scan lines;
an opposed substrate including a common electrode;
a liquid crystal layer being sealed between the array substrate and the opposed substrate by means of sealing agent that seals together the peripheries of the two substrates;
an ornamental reflective part including a reflector being deployed around the periphery of the array substrate's display region, wherein outer edges of the ornamental reflective part are sealed by the sealing agent, and the reflector and a transparent electrode at the ornamental reflective part of the array substrate are in a floating state;
a border region surrounding the display region, wherein the reflector exists at least at the border region of the array substrate, and an outer peripheral side of the border region lacks the common electrode at a position corresponding to the reflector;
a non-display region surrounding the border region, a black matrix being provided on the opposed substrate in the non-display region, wherein the black matrix does not extend to the border region, does not overlap with the common electrode, and is distinct from the sealing agent, and wherein the common electrode does not extend into the non-display region;
wherein the border region is between the display region and the non-display region.

2. The liquid crystal display panel according to claim 1, wherein the transparent electrode is formed on one of a surface and a rear surface of the reflector at the ornamental reflective part.

3. The liquid crystal display panel according to claim 1, wherein the reflector of the ornamental reflective part has a concavoconvex structure.

4. The liquid crystal display panel according to claim 1, wherein the reflector with concavoconvex structure is formed on part or whole of the front surface or rear surface of the pixel electrode.

5. The liquid crystal display panel according to claim 1, wherein the common electrode extends from the display region into the border region, and the common electrode does not extend to the outer peripheral side of the border region.

6. The liquid crystal display panel according to claim 1, wherein the liquid crystal layer extends into the non-display region.

* * * * *